Patented Jan. 26, 1965

3,167,533
EASILY PROCESSED POLYVINYL CHLORIDE RESINS
Frank J. Donat, Cleveland, Ohio, assignor to The B. F. Goodrich Company, New York, N.Y., a corporation of New York
No Drawing. Filed June 22, 1961, Ser. No. 118,770
17 Claims. (Cl. 260—86.3)

This invention relates to easily processed emulsion type polyvinyl chloride resins and more particularly pertains to thermally stable, easily processed, spherical, uniform particle size polyvinyl chloride resins and to a process for preparing same in emulsion comprising the use of insoluble soaps as the sole emulsifiers.

It is known that certain metal soaps of saturated, unsaturated and substituted fatty acids are excellent stabilizers for polyvinyl chloride as disclosed in U.S. Patent No. 2,075,543 and in British Plastics, vol. 27, pp. 176–9 (1954). The metal soap stabilizers are generally incorporated into the resin after the polymerization step has been completed. Moreover, it has been suggested that certain stabilizers be incorporated along with conventional emulsifiers into the polymerization recipe or in the isolation step in polyvinyl chloride synthesis as set forth in U.S. Patents 2,364,227, 2,365,506 and 2,508,801, British Patents 599,429 and 652,069 and Canadian Patent 453,165.

Several methods have been suggested for the provision of spherical, uniform particle size polyvinyl chloride latex resins including the use of a "seed" latex, the use of a mixture of water-soluble and monomer-soluble emulsifiers and the use of a special, highly critical technique of proportioning small amounts of conventional emulsifier into the polymerization mixture during the course of the polymerization reaction as set forth in British Patents 627,265, 698,359 and 699,016 respectively.

The use of materials commonly referred to as "insoluble soaps," "heavy metal soaps," "insoluble metal soaps," "polyvalent metal soaps," "driers" and "metallic soaps" as the sole emulsifiers for the emulsion polymerization of vinyl chloride or mixtures of vinyl chloride with other polymerizable monomers was not known at the time of the present invention. The prior art does not teach or suggest that such soaps would have any utility, per se, in the polymerization reaction. There is no indication in the prior art that such materials would have any value as emulsifiers in any aqueous system particularly in view of their known limited solubility in water. The "insoluble soaps" embodied herein are not regarded as emulsifiers for water systems. This invention, which is discussed in more detail below, is indeed unobvious and unexpected in view of the art.

It is an object of this invention to provide polyvinyl chloride resins which are very easily and rapidly processed in conventional plastic sheeting, molding and extrusion equipment. Another object is the provision of inherently stable polyvinyl chloride resins. Another object is the provision of a single step method for preparing spherical, uniform particle size polyvinyl chloride resins which are easily processed and are stable to heat and light. Still another object is the provision of a method for preparing spherical, uniform particle size polyvinyl chloride resins having a predetermined particle size which are particularly useful as paste resins in plastisol formulations.

That the accomplishment of the foregoing and other objects has been achieved will become evident from the following description and examples.

I have discovered a method for preparing heat stable, easily processable polyvinyl chloride resins comprising conducting the polymerization of a monomer mixture of from 70 to 100% by weight of vinyl chloride and from 0 to 30% by weight of at least one other polymerizable monomer in water with agitation in the presence of an "insoluble" soap as the sole emulsifier.

The polyvinyl chloride resins included herein are the homopolymers of vinyl chloride, copolymers and interpolymers of at least 70% by weight of vinyl chloride and up to 30% by weight of one or more various other vinyl monomers copolymerizable with vinyl chloride. For the purpose of this invention the other vinyl monomers which may be included in addition to the essential vinyl chloride in the polyvinyl chloride resins are monoolefinically unsaturated monomers, particularly those having a $CH_2=C<$ grouping or a $—CH=CH—$ grouping. Representative monoolefinically unsaturated monomers include the other vinyl halides such as vinyl bromide, vinyl fluoride, vinylidene chloride, vinylidene bromide, vinylidene fluoride, chlorotrifluoro ethylene, 1,2-dichloroethylene, and the like; the vinyl esters such as vinyl acetate, vinyl propionate, vinyl butyrate, vinyl benzoate, vinyl laurate, isopropenyl acetate, isopropenyl caproate, and the like; the acrylate and methacrylate esters such as methyl acrylate, ethyl acrylate, propyl acrylate, isopropyl acrylate, the butyl acrylates, the amyl acrylates, the hexyl acrylates, the heptyl acrylates, the octyl acrylates, the dodecyl acrylates, phenyl acrylate, cyclohexyl acrylate, methyl methacrylate, ethyl methacrylate, the propyl methacrylates, the butyl methacrylates, the amyl methacrylates, the hexyl methacrylates, the heptyl methacrylates, the octyl methacrylates, the nonyl methacrylates, the decyl methacrylates, the dodecyl methacrylates, phenyl methacrylate, cyclohexyl methacrylate and the like; the maleate and fumarate esters such as diethyl maleate, the dipropyl maleates, the dibutyl maleates, the diamyl maleates, the dihexyl maleates, the dioctyl maleates, the dilauryl maleates, dimethyl fumarate, diethyl fumarate, the dipropyl fumarates, the dibutyl fumarates, the diamyl fumarates, the dihexyl fumarates, the diheptyl fumarates, the dioctyl fumarates, the didecyl fumarates, dicyclohexyl fumarate, diphenyl fumarate and the like; the vinyl aromatic monomers such as styrene, the vinyl toluenes, the vinyl xylenes, vinyl naphthalene, and the like; the monoolefins such as ethylene, propylene, the butylenes, the amylenes, the hexylenes, cyclohexene, and the like; the vinyl ethers such as vinyl methyl ether, vinyl ethyl ether, the vinyl propyl ethers, the vinyl butyl ethers, the vinyl amyl ethers, the vinyl hexyl ethers, the vinyl heptyl ethers, the vinyl octyl ethers, vinyl cyclohexyl ether, vinyl phenyl ether, vinyl benzyl ether, and the like; the allyl esters and ethers such as allyl acetate, allyl laurate, allyl benzoate, allyl methyl ether, allyl ethyl ether and the like; vinyl cyanides such as acrylonitrile, methacrylonitrile, and the like and others.

Most preferred are the interpolymers of from 70 to 100% by weight of vinyl chloride and from 0 to 30% by weight of at least one other monomer selected from the group consisting of

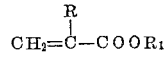

and

wherein R is a member of the group consisting of hydrogen and an alkyl group having from 1 to 4 carbon atoms, $R_1$ is a hydrocarbon group having from 1 to 12 carbon atoms, $R_2$ is a member selected from the group consisting of hydrogen and an alkyl group having from 1 to 4 carbon atoms and $R_3$ is a hydrocarbon group having from 1 to 12 carbon atoms. Even more preferred are the monomers in which $R_1$ and $R_3$ in the above formulas are alkyl groups having from 1 to 8 carbon atoms.

The metallic soaps or "insoluble" soaps useful as the sole emulsifiers in the present invention include the lithium and polyvalent metal salts of saturated, unsaturated and substituted fatty acids. The polyvalent metal moieties of the soaps embodied herein include in general the metals of groups II, III and IV of the Mendeléef periodic table and more particularly include beryllium, barium, calcium, magnesium, strontium, cadmium, zinc, lead, tin, titanium and aluminum. The fatty acid moieties preferred in the insoluble soaps embodied herein are octanoic, stearic, oleic, linoleic, ricinoleic, palmitic, abietic, and the like. Most preferred are the monobasic saturated fatty acids having from 8 to 22 carbon atoms. Also included in the present invention are the aforementioned polyvalent metal salts of organic sulfates such as barium lauryl sulfate and other hydrocarbon sulfates containing from 8 to 22 carbon atoms and the like. Mixtures of the foregoing insoluble soaps and sulfates may be employed but are less preferred in the process of this invention. The emulsifiers embodied herein are most useful in the range of from 0.075 part to 3 parts by weight (per 100 parts of monomer) and preferably from 0.1 to 1.0 part.

Most preferred in this invention are the insoluble soaps having the formula $(X-COO)_nM$ wherein X is an alkyl group having from 7 to 21 carbon atoms and M is a member selected from the group consisting of lithium, barium, calcium, magnesium, cadmium, zinc, lead, tin and aluminum.

The insoluble soaps used as the emulsifiers in the process embodied in this invention are characterized by having a limited solubility in water, more specifically, having a solubility at 20° C. of at least less than about 0.6 gram-mol per 1000 grams of water and usually less than about 0.1 gram-mol per 1000 grams of water at 20° C. The following table lists the solubilities of representative insoluble soaps embodied herein.

| Insoluble Soap | Temp., ° C. | Solubility in gms.-mols/1000 grams of $H_2O$ |
| --- | --- | --- |
| Lithium octanoate | 20 | 0.553 |
| Lithium decanoate | 21 | 0.080 |
| Barium octanoate | 21 | 0.027 |
| Calcium octanoate | 22.5 | 0.016 |
| Lithium laurate | 16.3 | 0.0075 |
| Lithium myristate | 16.3 | 0.0012 |
| Lithium palmitate | 18 | 0.00038 |
| Lithium stearate | 18 | 0.00034 |
| Barium laurate | 15.3 | 0.00015 |
| Barium myristate | 25 | 0.00012 |
| Barium palmitate | 15 | 0.00006 |
| Barium stearate | 15 | 0.00006 |
| Calcium laurate | 15 | 0.00009 |
| Calcium palmitate | 25 | 0.00005 |
| Calcium stearate | 15 | 0.00007 |
| Calcium oleate | 13 | 0.00012 |
| Lead laurate | 35 | 0.000015 |
| Lead myristate | 35 | 0.000008 |
| Lead palmitate | 35 | 0.000007 |
| Lead stearate | 35 | 0.000006 |
| Magnesium laurate | 25 | 0.000015 |
| Magnesium myristate | 15 | 0.000013 |
| Magnesium oleate | 25 | 0.000041 |
| Magnesium palmitate | 25 | 0.000015 |
| Magnesium stearate | 15 | 0.000005 |

Although lithium octanoate is comparatively much more soluble than the other soaps embodied in the invention, its solubility is still of a sufficiently limited nature to include it within the applicant's definition of an "insoluble soap."

The values for the solubilities of the "insoluble soaps," such as those listed above, are readily available by referring to the standard literature sources such as the "Handbook of Chemistry and Physics," published by Chemical Rubber Publishing Company, Cleveland, Ohio, and the treatises entitled "Solubilities of Inorganic and Metal Organic Compounds," third edition, 1940, by A. Seidel, and its revision, the fourth edition, 1958, by W. F. Linke, D. Van Nostrand Company, Inc.; or the solubilities are easily determined by conventional methods known to the physical chemist; for example, an excess of insoluble soap is added to boiling water and the stirred mixture is slowly cooled to the temperature for which the solubility value is desired. A representative sample is withdrawn from the mixture using a syringe equipped with a fritted glass filter to strain out the undissolved particulate solid soap. The sample is charged to a tared dish and a total weight is recorded. The sample is evaporated to dryness and the dish reweighed. The amount of "insoluble soap" that was dissolved in the water is calculated from this data.

The vinyl polymer latices or fine particle dispersions produced by the process of this invention generally contain polymer existing as uniform spherical particles having average diameters of from about 0.05 to 10 microns and more preferably from about 0.2 to 3 microns in diameter.

The emulsion polymerization process embodied herein is to be distinguished from the suspension polymerization processes. The distinction between the "emulsion" and "suspension" polymerization process is made in "Vinyl and Related Polymers" by C. A. Schildknecht, John Wiley & Sons, Inc., New York, 1952, pages 393–398.

It is possible, by varying the chain length of the organic portion of the "insoluble soap" embodied herein, to vary the particle size of a given resin. Generally the longer chain fatty acid insoluble soap emulsifiers give larger particle size resins than do the shorter fatty acid insoluble soap emulsifiers. With fatty acids having less than 12 carbons, however, the particle size again increases. It has been found that one can blend uniform lots of large and small particle polyvinyl chloride resins embodied herein and make pourable vinyl plastisols having desirable rheological properties by a method similar to that disclosed in U.S. Patent No. 2,553,916. The latices as well as the dried resins may be blended for the plastisol formulations.

The process of this invention is carried out conveniently in conventional polymerization equipment, preferably in the substantial absence of elemental oxygen and in the presence of a free-radical initiator at a temperature of about 100° C. or below. The polymerization reaction can be carried out at atmospheric, sub-atmospheric or super-atmospheric pressure. Preferably the polymerization is carried out at a reaction temperature in the range of from about 30° to 60° C. In general the polymerization temperature chosen does not influence the particle size or processability of the product, but as those skilled in the art know, lower temperatures tend to produce higher molecular weight products and higher temperatures tend to produce lower molecular weight polymers. It is also known that lower molecular weight resins soften at somewhat lower temperatures than their higher molecular weight analogues.

The free radical initiators useful in the present invention include chemicals which decompose to produce free radicals under the foregoing reaction conditions as well as various forms of actinic radiation such as ultraviolet light, X-rays and the various types of nuclear radiation. Preferred as free radical initiators in the present invention are the commonly used polymerization initiators including the peroxides, azo compounds and redox catalysts. Most preferred are the water-soluble initiators such as potassium persulfate, ammonium persulfate, sodium persulfate, hydrogen peroxide, potassium perphoshate and the like as well as the well known water-soluble redox initiators. Also included within the scope of the present invention are the alkyl borane-peroxide type catalysts described in the copending U.S. patent applications of Paul J. George et al. Ser. Nos. 733,255 and 733,265, both filed May 6, 1958 and U.S. Patent 3,025,284. The free radical initiator is most useful in the range of from about 0.01 part to 1.0 part per hundred parts of monomer and more preferably from 0.05 part to 0.3 part per hundred of monomer.

The polyvinyl chloride resins embodied herein can be prepared in recipes employing as much as 50% and more by weight of monomer. It is preferred to prepare by the present process polyvinyl chloride resin latices containing from about 20 to about 40% by weight of solids.

Conventional emulsion polymerization buffers may be employed in the present process, although they are not necessary for the practice of this invention. Buffers such as ammonia, $NaHCO_3$, $NH_4HCO_3$ and other water soluble salts generally give slightly more stable latices and often slightly larger particles. The pH of the polymerization mixture does not appear to be critical and it can be varied from about 2 to about 10. However, a pH of between 7 and 10 is preferred.

In the novel polymerization process embodied herein the best results are obtained and the most stable latex results when mild but thorough agitation is employed. Stated differently, the most stable latices results from the process embodied herein when good mixing with low shear is employed during the course of the polymerization. Although high shear mixing may cause some coagulation of the resin, no adverse effect on polymer stability or processability can be observed. The use of high shear mixing is actually a convenient way to coagulate the resin if it is desired to do so either during or after completion of the polymerization reaction. The use of conventional emulsifiers as post-polymerization emulsion stabilizers is within the scope of the present invention. It is essential that the polymerization be carried to completion in the presence of the insoluble soap as the sole emulsifier, however.

The polyvinyl chloride resins embodied herein may be isolated from their latices by conventional methods of coagulation with such agents as sodium chloride, calcium acetate, cadmium chloride, sodium carbonate, alcohols, hydrochloric acid, sulfuric acid and the like by procedures well known in the art. The polyvinyl chloride resin latices embodied herein can also be heat coagulated, shear coagulated, freeze coagulated or spray dried. The coagulated product is conveniently isolated by filtration, centrifugation or decantation and may be dried in conventional drying equipment.

The insoluble soaps embodied herein may be used per se or they may be generated in situ in the polymerization mixture. When the soaps are used per se it is generally necessary to homogenize the monomer prior to starting the polymerization. However, when the insoluble soap is generated in situ, the homogenization step usually is not necessary. The insoluble soap such as barium laurate may be generated in situ for instance by adding to the aqueous polymerization mixture substantially stoichiometric quantities of barium hydroxide and lauric acid.

The polyvinyl chloride resins embodied herein are distinguished from other emulsion type of synthetic vinyl resins not having spherical, substantially uniform particles of the aforementioned size, in that the former are much more easily processed in milling, calendering and extrusion equipment than are the latter. The synthetic vinyl resins embodied herein when melted can be extruded at 180° C. with a constant force (1,000 pounds on a ¼ inch ram or 1,500 pounds on a ¼ inch ram) through a fine orifice having a 0.0625 inch diameter at a high rate to give an extruded filament having a very smooth surface and exhibiting very low swell (i.e., the diameter of the extrudate should be below 0.070 inch).

In the following examples which will serve to illustrate the process of this invention, the amounts of ingredients are expressed in parts by weight unless otherwise indicated.

EXAMPLE I

The polymerization reaction was carried out in a Pfaudler glass-lined 15 gallon reactor equipped with a 16-inch 3-blade retreating impeller and a two finger baffle set at right angles. Into the reactor were charged 88 pounds of demineralized water containing about 0.3 ml. of 28% ammonium hydroxide per gallon of water and 0.12 pound of finely divided barium laurate. The resulting mixture was stirred, the temperature of the mixture was raised to 70° C. and the reactor and contents were purged free of oxygen with nitrogen. The pressure within the reactor was then reduced and 30 pounds of highly purified vinyl chloride monomer was introduced. The addition of the vinyl chloride monomer decreased the temperature of the reaction mixture to about 50° C. The reaction mixture was then passed through a two stage Gaulin homogenizer and back into the reactor under the pressure of vinyl chloride vapor. A solution of 0.015 pound of potassium persulfate in two pounds of demineralized water was then injected into the reaction mixture.

The polymerization was carried out at 50° C. and 60 r.p.m. for about 12 hours. At the end of this time the temperature was decreased to about 25° C. and the resulting polyvinyl chloride latex was drained out of the reactor. The final latex was found to have a pH of 8.6. A small sample of the latex was diluted with water and the particle size and shape was determined by depositing a small amount of the diluted latex on a copper grid, carefully drying and taking an electron photomicrograph of the deposited particles using a Philips (model E.M. 100 B.) electron microscope. The particles were found to be very uniform spheres having diameters of about 3,300 A. (0.33 micron).

The remainder of the latex was treated with a 10% solution of sodium chloride with stirring until the polymer particles were coagulated. The solid, granular product was isolated by filtration, was washed and dried at 50° C. in a vacuum oven. A conversion of 95.5% of monomer to polymer was obtained. The dried polyvinyl chloride was found to have an ASTM heat distortion temperature of 77° C. and an intrinsic viscosity of 1.2 in cyclohexanone at 25° C.

The flow (or ease of processing) properties of the foregoing polyvinyl chloride were studied by pelletizing a 2 gram sample of resin at about 5,000 p.s.i., heating the pellet at 180° C. for two minutes in a chamber fitted with a die at the lower end thereof said die having an orifice of 0.0625 inch in diameter. A plunger or ram which just fit in the opening of the chamber was allowed to rest on the upper face of the pellet during the aforementioned 2 minute heating period. The temperature was maintained at 180° C. and a constant force of 1,000 pounds on a 0.25 inch ram in one run was placed on the polymer and 1,500 pounds on a 0.25 inch ram was placed in another run on a second pellet. The softened resin was thus forced through the orifice and the rate of extrusion, texture of the surface, and the diameter of the cooled extrudate were examined. The polyvinyl chloride resin described above which was extruded under the foregoing conditions at 1,000 pounds had an exceptionally fast rate of extrusion, had a diameter of 0.065 inch and had a smooth, glossy surface. The sample of polyvinyl chloride resin described above which was pressed at 1,500 pounds in the foregoing manner extruded at a rate even faster than at 1,000 pounds, and the cooled extrudate had a smooth, glossy surface and a diameter of 0.068 inch. Both of the aforementioned extrudates were essentially colorless and clear indicating no decomposition (high stability to heat).

When the foregoing was repeated with the exception that sodium laurate was used in place of barium laurate in the polymerization recipe, the polyvinyl chloride product of comparable molecular weight and degree of branching had the following properties.

Property determined: Comments
   Percent conversion _ 94.
   Particle size _____ 800 to 1,700 A., broad distribution, not uniform.
   Flow _____ 1,000 pounds, slow extrusion, rough extrudate, 0.072 inch diameter of extrudate. 1,500 pounds, slow extrusion, rough extrudate, 0.074 inch diameter of extrudate.

Both extrudates were brown indicating decomposition had occurred.

When the foregoing was repeated using lauric acid in place of the barium laurate in the polymerization recipe the polyvinyl chloride product had the following properties:

No latex obtained—the polymer set up as a solid mass at 75% conversion.

Flow properties—1,000 pounds, slow rate, rough extrudate, 0.077 inch diameter. 1,500 pounds, slow rate, rough extrudate, 0.083 inch diameter.

Both extrudates were dark indicating decomposition by heating operation.

The foregoing polymerization was repeated with the exception that sodium lauryl sulfate was used in place of barium laurate as the emulsifier in the polymerization recipe and a product was obtained in 71% conversion in 16 hours at 50° C. The latex particles varied from 400 to 800 A. and were not uniform. In the flow test at 1,000 pounds a slow rate of extrusion was observed and the extrudate had a very rough surface and a diameter of 0.078 inch. The flow test at 1,500 pounds also gave a slow rate and the extrudate was very rough with a diameter of 0.083 inch.

The procedure set out in Example I of British Patent No. 652,069 was essentially repeated using the following recipe:

Vinyl Chloride _____ 100
Potassium persulfate _____ 1.5
Potassium stearate _____ 1.5
Potassium hydroxide _____ 0.1
Lead stearate _____ 0.1

A polymerization temperature of 40° C. was employed and a conversion of 96.5% was obtained. The resulting latex had particle sizes ranging from 350 to 800 A. and a wide distribution of sizes between these limits was observed. The dried resin extruded slowly in the flow test at 1,000 pounds to give a rippled, rough extrudate having a diameter of 0.078 inch and 1,500 pounds to give a rippled, rough extrudate having a diameter of 0.080 inch. Both extrudates were dark colored.

A polyvinyl chloride resin was prepared according to the teaching of U.S. Patent No. 2,365,506 from the following recipe:

Vinyl chloride _____ 100
Caprylyl peroxide _____ 0.15
Gelatin _____ 0.19
Water _____ 187.5
Lead acetate _____ 0.94

A slurry resembling fine grains of sand resulted at 40° C. in 68 hours. A conversion of 90.2% was obtained. The particles were large fused agglomerates and it was not possible to determine particle size distribution by the electron microscope technique. The flow test at 1,000 pounds gave a rippled, rough extrudate having a diameter of 0.079 inch and at 1,500 pounds gave a rippled, rough extrudate having a diameter of 0.088 inch.

EXAMPLE II

The procedure set forth in Example I was substantially repeated using various types and varying amounts of barium soaps as the sole emulsifier in the polymerization recipe. When the barium soap was prepared in situ, for instance, by adding equivalent amounts of lauric acid and barium hydroxide to the reaction mixture, the homogenization step described in Example I could be eliminated. The resulting polymers all showed rapid extrusion rates and in no case did any polymer extrudate have a diameter in excess of 0.068 inch even when extruded at 1,500 pounds. All of the polymer extrudates had smooth, glossy surfaces and were essentially colorless. The results of these experiments are given in Table 1 wherein the amounts of emulsifier, water and catalyst are given in parts per one hundred parts of vinyl chloride monomer.

Table 1

| Emulsifier | | Percent Conversion | H₂O | K₂S₂O₈ | pH | Temp., °C. | Reaction Time, Hrs. | Particle Size |
|---|---|---|---|---|---|---|---|---|
| Barium Laurate | 0.35 | 95.5 | 250 | 0.3 | 8.6 | 50 | 8.9 | 3300 A., very uniform spheres. |
| Do | 0.5 | 90 | 300 | 0.3 | 7 | 50 | 6 | 3100 A., uniform. |
| Do | 0.75 | 85.5 | 300 | 0.25 | 9.3 | 40 | 15.5 | 3100 A., uniform. |
| Barium Stearate | 0.35 | 82 | 200 | 0.15 | 10.3 | 40 | 9.5 | 4000 A., very uniform. |
| Do | 0.983 | 66.5 | 300 | 0.25 | 9.6 | 40 | 15.5 | 4000 A., very uniform. |
| Do | 1.00 | 82 | 200 | 0.15 | 7.7 | 50 | 6.1 | 4100 A., very uniform. |
| Barium Myristate | 0.25 | 85.5 | 300 | 0.25 | 9.3 | 40 | 15.5 | 3800 A., uniform. |

EXAMPLE III

A copolymer was prepared according to the procedure of Example I from the following recipe:

Vinyl chloride (purified) _____ 70
Methyl acrylate _____ 30
Potassium persulfate _____ 0.1
Barium laurate _____ 0.5
Demineralized water _____ 300

The polymerization step described in Example I was used. A polymerization time of 15.5 hours was employed and a reaction temperature of 50° C. was maintained. A 43.6% conversion was obtained. The latex particles were spherical and very uniform at 3300 A. diameter and the dried resin extruded rapidly at 180° C. in the flow test described in Example I to give a very smooth extrudate having very little swell (diameter of the extrudate was less than 0.070 inch).

EXAMPLE IV

A copolymer was prepared according to the procedure of Example I from the following recipe:

Vinyl chloride (purified) _____ 95
Vinyl acetate _____ 5
Potassium persulfate _____ 0.2
Barium laurate _____ 0.5
Demineralized water _____ 300

The polymerization reaction was carried out for 16 hours at 50° C. to 91.6% conversion. The resulting latex contained very uniform spherical particles having a diameter of 5000 A. The dried resin had a high extrusion rate and gave a smooth extrudate with very little swell (diameter of extrudate was less than 0.070 inch) in the flow test described in Example I.

EXAMPLE V

Several polyvinyl chlorides were prepared according to the procedure given in Example I wherein the type and amount of polyvalent metal soap emulsifier was varied. The results are given in Table 2. In each run 300 parts of water per 100 parts of vinyl chloride were employed. The resulting polymers had intrinsic viscosities in cyclohexanone varying from 1.1 to 1.5. In some of these runs sodium bicarbonate was used in place of ammonium hydroxide as the buffering agent. None of the polyvinyl chloride latices listed in Table 2 gave extrudates having diameters greater than 0.070 inch and they all gave extrudates having smooth, glossy surfaces in the flow test described in Example I. The polymerization time for each of the polymers listed in Table 2 was 15.5 hours.

Table 2

| Emulsifier | Percent Conversion | $K_2S_2O_8$ | pH | Temperature, °C. | Particle size |
|---|---|---|---|---|---|
| Aluminum Stearate | 1.22 | 93.2 | 0.25 | 7.1 | 40 | 1500 A., uniform spheres. |
| Cadmium Stearate | 0.95 | 88.5 | 0.25 | 8.5 | 40 | 5000 A., uniform. |
| Cadmium Stearate / Sodium Bicarbonate | 0.50 / 0.10 | 94.4 | 0.05 | | 50 | 8000 A., very uniform. |
| Calcium Stearate | 0.848 | 92 | 0.25 | 6.1 | 40 | 4000 A., uniform. |
| Calcium Laurate | 0.611 | 82 | 0.25 | 6.7 | 40 | 3000 A., very uniform. |
| Calcium Laurate / Sodium Bicarbonate | 0.40 / 0.10 | 73.4 | 0.05 | 8.7 | 50 | 3000 A., very uniform. |
| Lead Stearate | 1.08 | 86.5 | 0.25 | 7.1 | 40 | 3150 A., uniform. |
| Magnesium Stearate | 0.826 | 93.8 | 0.25 | 7.0 | 40 | 4000 A., uniform. |
| Magnesium Stearate / Sodium Bicarbonate | 0.5 / 0.10 | 97 | 0.05 | 7.6 | 50 | 3700 A., very uniform. |
| Magnesium Laurate | 0.64 | 89 | 0.2 | 9.9 | 40 | 2100 A., very uniform. |
| Stannous Stearate | 0.857 | 25 | 0.25 | 2.4 | 40 | 4500 A., uniform. |
| Cadmium Laurate / Barium Laurate | 0.25 / 0.25 | 92 | 0.25 | 3.0 | 50 | 3500 A., very uniform. |

Plastisols were prepared from 100 parts of resin prepared with insoluble soap as the sole emulsifier in the foregoing manner and 60 parts of dioctyl phthalate using dry resin which had first been microatomized to reduce substantially all the agglomerates to the ultimate particle size. The Brookfield viscosities were determined on each plastisol after it had been allowed to stand one hour. Plastisol A contained 100 parts of polyvinyl chloride having a uniform particle size of 6,400 A. in 60 parts of dioctyl phthalate; plastisol B contained 100 parts of polyvinyl chloride having a uniform particle size of 1,200 A. and 60 parts of dioctyl phthalate; and plastisol C contained 80 parts of polyvinyl chloride having a uniform particle size of 6,400, 20 parts of polyvinyl chloride having a uniform particle size of 1,200 A. and 60 parts of dioctyl phthalate. The viscosities were determined at several spindle speeds (r.p.m.).

| R.P.M. | A | B | C |
|---|---|---|---|
| 2 | 500 poise | 450 poise | 120 poise. |
| 4 | Too high to measure | Too high to measure | 79.5 poise. |
| 10 | do | do | 46.5 poise. |
| 20 | do | do | 32.5 poise. |

EXAMPLE VI

The procedure of Example I was repeated with the exception that barium lauryl sulfate was used in place of barium laurate with the following results (Table 3).

Table 3

| Emulsifier | Percent Conversion | $K_2S_2O_8$ | pH | Temperature, °C. | Particle Size |
|---|---|---|---|---|---|
| Barium Lauryl Sulfate. | 0.17 | 76 | 0.25 | 2.0 | 50 | 1100 to 1700 A., uniform spheres. |
| Do | 0.25 | 83 | 0.375 | 2.4 | 50 | 1100 to 1600 A., uniform. |

EXAMPLE VII

The procedure of Example I was followed except that lithium soaps were used in place of the barium laurate emulsifier and the results are given in Table 4. The polyvinyl chloride resins shown in Table 4 gave smooth extrudates at a rapid rate none of which had diameters as high as 0.070 inch in the flow test described in Example I.

Table 4

| Emulsifier | Percent Conversion | $K_2S_2O_8$ | pH | Temperature, °C. | Particle Size |
|---|---|---|---|---|---|
| Lithium Laurate. | 0.289 | 80 | 0.25 | 7.3 | 40 | 800 to 1700 A., uniform spheres. |
| Lithium Stearate. | 0.3 | 71.2 | 0.1 | 7.9 | 50 | 900 to 1600 A, uniform. |
| Lithium Myristate. | 0.325 | 95 | 0.25 | 7.5 | 40 | 500 to 1300 A., uniform. |

I claim:

1. The method for preparing a heat stable, easily processable polyvinyl chloride resin comprising polymerizing a mixture of from 70 to 100% by weight of vinyl chloride and from 0 to 30% by weight of at least one monomer selected from the group consisting of

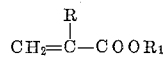

and

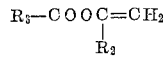

wherein R is a member of the class consisting of hydrogen and an alkyl group having from 1 to 4 carbon atoms, $R_1$ is a hydrocarbon group having from 1 to 12 carbon atoms, $R_2$ is a member selected from the class consisting of hydrogen and an alkyl group having from 1 to 4 carbon atoms and $R_3$ is a hydrocarbon group having from 1 to 12 carbon atoms, in water in admixture with from 0.01 part to 1.0 part per 100 parts of the monomers of a free-radical catalyst and, as the sole emulsifier, from 0.075 to 3 parts per 100 parts of the monomers of at least one insoluble soap having the structure $(X-COO)_nM$ wherein X represents an alkyl group having from 7 to 21 carbon atoms, $n$ is a whole number equal to the valence of M, and M is a member selected from the group consisting of lithium, barium, calcium, magnesium, cadmium, zinc, lead, tin and aluminum, with agitation in the substantial absence of oxygen at a temperature below about 100° C., said resin characterized by being composed of spherical, uniform size particles residing within the range of from about 0.05 to 10 microns.

2. The method for preparing a heat stable, easily processable polyvinyl chloride resin, said resin characterized by being composed of spherical, uniform size particles residing within the range of from about 0.05 to 10 microns, comprising polymerizing vinyl chloride in water in admixture with from 0.1 to 1.0 part by weight per 100 parts of vinyl chloride of a free-radical catalyst and as the sole emulsifier from 0.075 to 3 parts by weight per 100 parts of vinyl chloride of at least one insoluble soap having the structure $(X-COO)_nM$ wherein X represents an alkyl group having from 7 to 21 carbon atoms, $n$ is a whole number equal to the valence of M, and M is a member selected from the group consisting of lithium, barium, calcium, magnesium, cadmium, zinc, lead, tin and aluminum, with agitation in the substantial absence of oxygen at a temperature below about 100° C.

3. The method for preparing a heat stable, easily processable polyvinyl chloride resin, said resin characterized by being composed of spherical, uniform size particles residing within the range of from about 0.05 to 10 microns, comprising polymerizing vinyl chloride in water in admixture with from 0.01 to 1.0 part by weight per 100 parts of vinyl chloride of a free-radical catalyst and as the sole emulsifier from 0.1 to 1 part by weight per 100 parts of vinyl chloride of barium laurate, with agitation in the substantial absence of oxygen at a temperature of from about 30° to 60° C.

4. The method for preparing a heat stable, easily processable polyvinyl chloride resin, said resin characterized by being composed of spherical, uniform size particles residing within the range of from about 0.05 to 10 microns, comprising polymerizing vinyl chloride in water in admixture with from 0.01 to 1.0 part by weight per 100 parts of vinyl chloride of a free-radical catalyst and as the sole emulsifier from 0.1 to 1.0 part by weight of cadmium stearate, with agitation in the substantial absence of oxygen at a temperature of from about 30° to 60° C.

5. The method for preparing a heat stable, easily processable polyvinyl chloride resin, said resin characterized by being composed of spherical, uniform size particles residing within the range of from about 0.05 to 10 microns, comprising polymerizing vinyl chloride in water in admixture with from 0.01 to 1.0 part by weight per 100 parts of vinyl chloride of a free-radical catalyst and as the sole emulsifier from 0.1 to 1 part by weight per 100 parts of vinyl chloride of calcium stearate, with agitation in the substantial absence of oxygen at a temperature of from about 30° to 60° C.

6. The method for preparing a heat stable, easily processable polyvinyl chloride resin, said resin characterized by being composed of spherical, uniform size particles residing within the range of from about 0.05 to 10 microns, comprising polymerizing a monomer mixture of 95% by weight of vinyl chloride and 5% by weight of vinyl acetate in water in admixture with from 0.01 to 1.0 part by weight per 100 parts of said mixture of a free-radical catalyst and as the sole emulsifier from 0.1 to 1 part by weight per 100 parts of said monomer mixture of barium laurate, with agitation in the substantial absence of oxygen at a temperature of from about 30° to 60° C.

7. The method for preparing a heat stable, easily processable polyvinyl chloride resin, said resin characterized by being composed of spherical, uniform size particles residing within the range of from about 0.05 to 10 microns, comprising polymerizing a monomer mixture of 70% by weight of vinyl chloride and 30% by weight of methyl acrylate in water in admixture with from 0.01 to 1.0 part by weight per 100 parts of said monomer mixture of a free-radical catalyst and as the sole emulsifier from 0.1 to 1 part by weight per 100 parts of said mixture of barium laurate, with agitation in the substantial absence of oxygen at a temperature of from about 30° to 60° C.

8. The method for preparing a heat stable, easily processable polyvinyl chloride resin in aqueous emulsion comprising polymerizing in admixture with a free-radical catalyst and in the substantial absence of oxygen a monomeric mixture of from 70 to 100% by weight of vinyl chloride and from 0 to 30% by weight of at least one other monoolefinically unsaturated monomer having a $$CH_2=\overset{|}{C}\phantom{a}$$

grouping and being copolymerizable with said vinyl chloride, in water with agitation in admixture with an insoluble soap as the sole emulsifier, said insoluble soap being the salt of a polyvalent metal and a fatty acid having from 8 to 22 carbon atoms, said resin characterized by being composed of spherical, uniform size particles residing within the range of from about 0.05 to 10 microns.

9. The method for preparing a heat stable, easily processable polyvinyl chloride resin in aqueous emulsion comprising polymerizing in admixture with a free-radical catalyst and in the substantial absence of oxygen at a temperature below about 100° C., a monomeric mixture of from 70 to 100% by weight of vinyl chloride and from 0 to 30% by weight of at least one other monoolefinically unsaturated monomer having a $$CH_2=\overset{|}{\underset{|}{C}}$$

grouping and being copolymerizable with said vinyl chloride, in water with agitation in admixture with from 0.075 to 3 parts per 100 parts by weight of monomers of an insoluble soap as the sole emulsifier, said insoluble soap being the salt of a polyvalent metal and a fatty acid having from 8 to 22 carbon atoms, said resin characterized by being composed of spherical, uniform size particles residing within the range of from about 0.05 to 10 microns.

10. The method of claim 9 wherein the insoluble soap is a salt of barium and a fatty acid having from 8 to 22 carbon atoms.

11. The method of claim 9 wherein the insoluble soap is a salt of aluminum and a fatty acid having from 8 to 22 carbon atoms.

12. The method of claim 9 wherein the insoluble soap is a salt of cadmium and a fatty acid having from 8 to 22 carbon atoms.

13. The method of claim 9 wherein the insoluble soap is a salt of calcium and a fatty acid having from 8 to 22 carbon atoms.

14. The method of claim 9 wherein the insoluble soap is a salt of lead and a fatty acid having from 8 to 22 carbon atoms.

15. The method of claim 9 wherein the insoluble soap is a salt of magnesium and a fatty acid having from 8 to 22 carbon atoms.

16. The method of claim 9 wherein the insoluble soap is a salt of tin and a fatty acid having from 8 to 22 carbon atoms.

17. The method of claim 9 wherein the insoluble soap is a salt of zinc and a fatty acid having from 8 to 22 carbon atoms.

References Cited by the Examiner

UNITED STATES PATENTS

| | | | |
|---|---|---|---|
| 1,932,889 | 10/33 | Groff | 260—87.1 |
| 2,075,543 | 3/37 | Reed et al. | 260—45.75 |
| 2,365,506 | 12/44 | Alexander | 260—91.7 |
| 2,485,616 | 10/49 | Long et al. | 260—92.8 |
| 2,508,801 | 5/50 | Sans | 260—92.8 |
| 2,569,447 | 10/51 | Borglin et al. | 260—92.8 |
| 2,981,722 | 4/61 | Enk | 260—92.8 |

FOREIGN PATENTS

| | | |
|---|---|---|
| 453,165 | 12/48 | Canada. |
| 599,429 | 3/48 | Great Britain. |
| 652,069 | 4/51 | Great Britain. |

OTHER REFERENCES

Smith: British Plastics, vol. 27, pp. 176–9 (1954).

JOSEPH L. SCHOFER, *Primary Examiner.*

H. N. BURSTEIN, WILLIAM H. SHORT, JAMES A. SEIDLECK, *Examiners.*

UNITED STATES PATENT OFFICE
CERTIFICATE OF CORRECTION

Patent No. 3,167,533                           January 26, 1965

Frank J. Donat

It is hereby certified that error appears in the above numbered patent requiring correction and that the said Letters Patent should read as corrected below.

Column 3, line 31, after "aluminum" insert -- and n is a whole number equal to the valence of M --; same column 3, line 32, beginning with "The insoluble soaps" strike out all to and including "from this data." in column 4, line 13; column 5, line 22, for "results" read -- result --.

Signed and sealed this 6th day of July 1965.

(SEAL)
Attest:

ERNEST W. SWIDER                                    EDWARD J. BRENNER
Attesting Officer                                        Commissioner of Patents